(12) United States Patent
Liedtke et al.

(10) Patent No.: US 11,119,291 B2
(45) Date of Patent: Sep. 14, 2021

(54) ACTUATOR FOR ADJUSTING A MOVABLE ELEMENT, USES AND METHODS OF ADJUSTMENT

(71) Applicant: Carl Zeiss Microscopy GmbH, Jena (DE)

(72) Inventors: Mirko Liedtke, Jena (DE); Tobias Kaufhold, Jena (DE); Franziska Tischer, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 131 days.

(21) Appl. No.: 16/334,880

(22) PCT Filed: Sep. 27, 2017

(86) PCT No.: PCT/EP2017/074450
§ 371 (c)(1),
(2) Date: Mar. 20, 2019

(87) PCT Pub. No.: WO2018/060223
PCT Pub. Date: Apr. 5, 2018

(65) Prior Publication Data
US 2019/0278047 A1    Sep. 12, 2019

(30) Foreign Application Priority Data

Sep. 30, 2016    (DE) ..................... 10 2016 219 055.5

(51) Int. Cl.
*G02B 7/02*    (2021.01)
*F03G 7/06*    (2006.01)
(Continued)

(52) U.S. Cl.
CPC ............... *G02B 7/023* (2013.01); *F03G 7/06* (2013.01); *F03G 7/065* (2013.01); *G02B 7/021* (2013.01);
(Continued)

(58) Field of Classification Search
CPC .... G02B 21/0024; G02B 7/08; G02B 13/004; G02B 13/0045; G02B 13/0065;
(Continued)

(56) References Cited

U.S. PATENT DOCUMENTS

| | | | |
|---|---|---|---|
| 7,338,439 B2 | 3/2008 | Kanai | |
| 7,591,834 B2 | 9/2009 | Buckley et al. | |

(Continued)

FOREIGN PATENT DOCUMENTS

| | | |
|---|---|---|
| DE | 197 38 296 | 3/1999 |
| DE | 198 42 923 | 3/2000 |

(Continued)

OTHER PUBLICATIONS

International Preliminary Report on Patentability dated Apr. 2, 2019 in PCT/EP2017/074450.
(Continued)

*Primary Examiner* — Brandi N Thomas
(74) *Attorney, Agent, or Firm* — Grüneberg and Myers PLLC

(57) ABSTRACT

An actuator for adjusting a movable element in a beam path of an optical arrangement, includes the movable element, a carrier, and at least one SMA element, said SMA element being connected to the movable element and being designed so as to be supported on the carrier such that when the extension of the SMA element alters, a directed force effect is produced between said movable element and carrier.

15 Claims, 8 Drawing Sheets

(51) Int. Cl.
*G02B 21/02* (2006.01)
*G02B 21/00* (2006.01)
*G02B 7/08* (2021.01)
*G02B 7/10* (2021.01)
*G02B 27/00* (2006.01)
*G03B 3/10* (2021.01)
*G03B 5/00* (2021.01)
*G03B 11/00* (2021.01)

(52) U.S. Cl.
CPC ............... *G02B 7/08* (2013.01); *G02B 7/102* (2013.01); *G02B 21/0032* (2013.01); *G02B 21/02* (2013.01); *G02B 27/0075* (2013.01); *G03B 3/10* (2013.01); *G03B 5/00* (2013.01); *G03B 11/00* (2013.01); *G03B 2205/0076* (2013.01)

(58) Field of Classification Search
CPC ............. G02B 13/007; G02B 13/0075; G02B 13/0085; G02B 13/009; G02B 15/16; G02B 15/177; G02B 23/2438; G02B 3/0081; G02B 7/005; G02B 7/026; G02B 7/04; G02B 7/102; G02B 13/001; G02B 23/2476
USPC .......................... 359/811, 813, 815, 819–824
See application file for complete search history.

(56) References Cited

U.S. PATENT DOCUMENTS

| | | |
|---|---|---|
| 8,248,497 B2 | 8/2012 | Tanimura et al. |
| 8,427,533 B2 | 4/2013 | Sakai et al. |
| 8,441,749 B2 | 5/2013 | Brown et al. |
| 9,726,862 B2 | 8/2017 | Hou et al. |
| 2005/0052753 A1 | 3/2005 | Kanai |
| 2005/0212630 A1 | 9/2005 | Buckley et al. |
| 2008/0198249 A1 | 8/2008 | Tanimura et al. |
| 2009/0185032 A1 | 7/2009 | Sakai et al. |
| 2011/0107758 A1* | 5/2011 | Kotanagi ................ F03G 7/065 60/528 |
| 2011/0279916 A1 | 11/2011 | Brown et al. |
| 2013/0242069 A1 | 9/2013 | Kobayashi |
| 2014/0243971 A1* | 8/2014 | Pugh .................... A61F 2/1624 623/6.22 |
| 2015/0042834 A1* | 2/2015 | Miao .................... H04N 5/2251 348/218.1 |
| 2015/0227200 A1* | 8/2015 | Norieda ................ G06F 3/041 345/173 |
| 2016/0018626 A1 | 1/2016 | Hou et al. |

FOREIGN PATENT DOCUMENTS

| | | |
|---|---|---|
| DE | 10 2004 054 359 | 5/2006 |
| DE | 10 2009 013 126 | 10/2009 |
| DE | 10 2010 015 447 | 10/2011 |
| EP | 2 140 138 | 4/2012 |
| JP | H09-127398 | 5/1997 |
| JP | H11-38333 | 2/1999 |
| JP | 2007-333792 | 12/2007 |
| WO | 2007/113478 | 10/2007 |
| WO | 2013/121225 | 8/2013 |

OTHER PUBLICATIONS

English translation of Written Opinion dated Mar. 12, 2018 in PCT/EP2017/074450.
International Search Report dated Mar. 12, 2018 in PCT/EP2017/074450 with English translation.
Written Opinion dated Mar. 12, 2018 in PCT/EP2017/074450.
Cho et al, "*Exploitation of shape memory alloy actuator using resistance feedback control and its development,*" Progress in Natural Science: Materials International 20(2010) 97-103 doi: 10.1016/S1002-0071(12)60013-6.

* cited by examiner

ACTUATOR FOR ADJUSTING A MOVABLE ELEMENT, USES AND METHODS OF ADJUSTMENT

This application is a National Stage entry under § 371 of international Application No. PCT/EP2017/074450, filed on Sep. 27, 2017, and which claims the benefit of German Application No. 10 2016 219 055.5, filed on Sep. 30, 2016.

BACKGROUND OF THE INVENTION

Field of the Invention

The invention relates to an actuator and apparatuses for adjusting an element to be moved in the beam path of an optical arrangement. Furthermore, the invention relates to uses of the adjustment drives and adjustment methods.

Description of the Related Art

The use of motors, piezo-drives or else solenoids, for example, for adjusting elements to be moved, in particular in optical arrangements, is known. These may also be used to carry out movements in a (partly) automated optical arrangement such as a microscope. Thus, for example, the focus or magnification can be modified, or a filter can be changed.

The ability of certain alloys (shape-memory alloys, SMAs) to readopt their original form after heating has been known for some time. The forces arising in the process are suitable for positioning movable elements in targeted fashion.

A first approach was already described in EP 2 140 138 91 and implemented for producing a movement in a camera phone. EP 2 140 138 B1 has disclosed a control system for an SMA actuating apparatus, in particular. The SMA actuating apparatus has an SMA actuator which causes the movement of a movable component in the case of a contraction on account of thermal effects. The control system comprises a current source. The SMA actuator is heated by electric current flowing through the SMA actuator. Further, a detector circuit for detecting the electrical resistance of the SMA actuator and a controller for controlling the current source are present. The SMA actuator is heated by means of the controller while the electrical resistance of the SMA actuator is monitored. A position of a movable component is captured and, depending on the position, the SMA actuator is heated further or cooled in order to set the position of the movable component. Accurate positioning of the actuator is possible by the opposed arrangement of the wires made of a shape memory metal. At the same time, the current position can be deduced by a resistance measurement of the employed wires.

U.S. Pat. No. 8,441,749 B2 has described an actuator that is based on shape memory alloys (SMAs). The latter comprises a carrier, an element to be moved and a holding apparatus with a multiplicity of elastic connection elements between carrier and element to be moved. The element to be moved is guided along an axis as a result of the effect of the holding apparatus. When its length is changed, at least one SMA element in the form of a wire exerts a force on the element to be moved.

WO 2013/121225 A1 has disclosed an actuator comprising four SMA elements in the form of wires, a carrier and an element to be moved. In the case of each SMA element, one end is connected to the carrier and the other end is connected to the element to be moved. The force effects produced by the SMA elements are aligned counter to one another. The element to be moved is positionable in an XY-plane by way of a targeted change in the lengths of the SMA elements.

WO 2007/113478 relates to an actuator for moving a camera lens. The actuator comprises a carrier, the camera lens, a holding apparatus for guiding the movement of the camera lens along its optical axis and at least one pair of SMA elements. The latter are arranged under tensile stress between the camera lens and the carrier.

SUMMARY OF THE INVENTION

The invention is based on the object of proposing further actuators and/or actuators that are improved over the prior art. Furthermore, the invention is based on the object of specifying new apparatuses, uses and methods employing the actuators.

The objects of the present inventions are achieved by the following embodiments:

An actuator for producing actuating movement of an element to be moved in a beam path of an optical arrangement, said actuator comprising: the element to be moved, a carrier, and at least one SMA element, wherein the SMA element is connected to the element to be moved and embodied so as to be supported on the carrier such that a directed force effect is produced between the element to be moved and the carrier in the case of a change in the extent of the SMA element.

An apparatus for producing an actuating movement of an element to be moved comprising a pinhole, of a sensor, of at least two Alvarez plates relative to one another and/or of a correction mirror, comprising: an actuator as above, an evaluation unit for evaluating current spatial coordinates, and a control unit for generating control commands depending on the evaluated current spatial coordinates.

A method for moving a component of an objective into position, said method comprising: moving said component of said objective into position with an actuator as above.

A method for producing an actuating movement of an element to be moved comprising a pinhole, of a correction mirror, of a sensor or of at least two Alvarez plates relative to one another, said method comprising: producing said actuating movement with an actuator as above.

A method for producing an actuating movement of a sensor comprising a number of sensor elements by fractions of the extent of a sensor element, said method comprising: producing said actuating movement with an actuator as above.

A method for producing an actuating movement of a sensor comprising a number of sensor elements, said method comprising: producing said actuating movement with an actuator as above, wherein actual measured values of the sensor present in the optical arrangement are captured and evaluated by virtue of the actual measured values being compared to intended measured values and, depending on the result of the comparison, control commands being generated, wherein an actuating movement of the sensor is implemented by distances that are fractions of one of the dimensions of the sensor elements.

A method for producing an actuating movement of an element to be moved, comprising: moving the element to be moved into position at an intended position with an actuator as above, and affixing the element to be moved at the intended position with a non-solidified and reversibly solidifiable fastening material, wherein the non-solidified fastening material is converted into the solidified state.

The object is achieved by an actuator for producing an actuating movement and for moving an element to be moved into position in a beam path of an optical arrangement. The actuator comprises the element to be moved, a carrier and at least one SMA element, wherein the SMA element is connected to the element to be moved and embodied so as to be supported on the carrier. If there is a change in the extent of the SMA element, a directed force effect is produced between the element to be moved and the carrier.

DETAILED DESCRIPTION OF THE INVENTION

Figure 1:
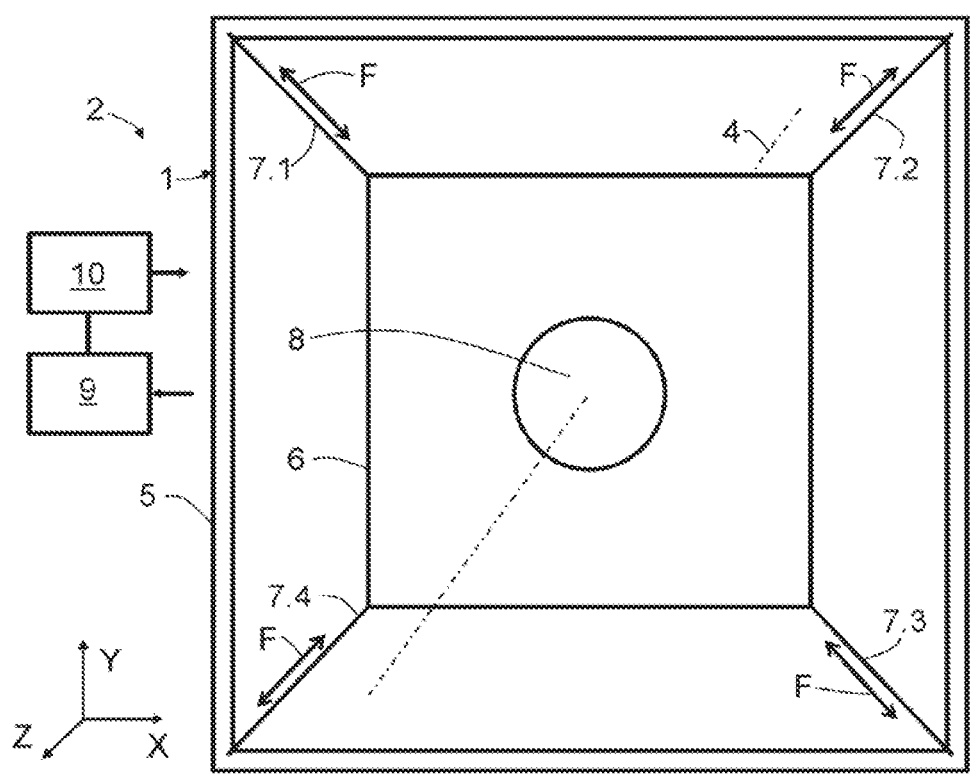
FIG. 1 shows a schematic illustration of a first exemplary embodiment of an actuator according to the invention.

A movement of the element to be moved into position is implemented by producing an actuating movement, as a consequence of which the element to be moved is moved to a desired position and/or into a desired orientation or relative orientation (=moved into position), for example.

Below, moving into position is also understood to mean the possibility of adjusting the element to be moved in respect of an intended position, the optical axis and/or in respect of other elements of the actuator or an arrangement comprising the actuator. An adjustment is considered to be a possible realization of an actuating movement. An adjustment can be carried out once, several times or continuously.

In the present description, SMA elements are understood to be those elements that substantially consist of a shape-memory material. Shape-memory materials can be shape-memory alloys or shape-memory polymers, SMPs, and the combinations thereof. Further, shape-memory materials can be materials as described in U.S. Pat. No. 7,591,834 B2.

A connection between the SMA element and the element to be moved can be realized by a force-fit, interlocking and/or cohesive connection. Furthermore, such a connection is understood to mean embodiments in which the SMA element rests on the element to be moved, at least over a portion of its extent, and/or in which the SMA element is guided through the element to be moved and mechanically interacts with the latter.

The SMA element can be supported on the carrier with a loose end or with a portion that does not have a form-fit or cohesive connection to the carrier. In further embodiments, the SMA element can be detachably or non-detachably connected to the carrier.

By way of example, connections are detachable connections, in particular force-fit and/or interlocking connections, such as screwed connections, clamped connections or plug-in connections. In further embodiments, connections can be nondetachable force-it, interlocking and/or cohesive connections, such as adhesively bonded connections, welded connections, cast connections or press-fit connections.

In one possible embodiment of the actuator, the SMA element is arranged about an axis in helical fashion such that, in the case of a change in the extent of the SMA element in the direction of its length, a directed force effect is caused in the direction of the axis, in particular along the axis, and/or a rotation of the actuator about the axis is caused.

Here, the axis can be a longitudinal axis of the element to be moved, for example. In further embodiments, the axis is a body axis of a further structure, for example, which is connected to the element to be moved. In such a case, an indirect connection can be formed between the SMA element and the element to be moved.

In further embodiments, at least one SMA element is arranged about the axis in helical fashion. If two or more SMA elements are arranged about the axis in helical fashion, said SMA elements advantageously have the same design. If the at least two SMA elements are used simultaneously and in the same sense for producing a movement of the element to be moved, a similar design, or the same design, of the SMA elements offers advantages in the actuation thereof since the control parameters can be chosen to be approximately the same or exactly the same for all SMA elements.

The advantages of such an embodiment lie in small spatial requirements and a robust embodiment of the actuator. By way of example, such an embodiment is usable for displacing optical lenses along the optical axis.

In order to obtain a long service life, the SMA elements, in particular in the form of wires made of a shape-memory material, should not be stretched by more than 1 to 2%. In order nevertheless to obtain a sufficient movement, wires with a relatively long length are kept available. The application in a rotationally symmetric component, in particular, allows repeated winding up and down of the wire, and hence a space-saving design.

Occurring frictional losses can be kept low if a sliding coating, for example a coating containing polytetrafluoroethylene (PTFE), is applied to the SMA element, to a body surrounding the axis in coaxial fashion, for example, and/or to a sliding element arranged between the SMA element and the body. In additional or alternative embodiments, friction between the SMA element and body can be reduced by suitable bearings, for example in the form of rollers, balls or polished surfaces.

If the SMA elements are operated in the opposite sense in further embodiments of the actuator, the force effect of at least one SMA element can be partly compensated by the force effects of at least one further SMA element, as a result of which driving beyond a desired position can be largely avoided.

Instead of SMA elements operated in the opposite sense, or in addition thereto, provision can be made of at least one spring element, which acts as an antagonist to the at least one SMA element.

In a further embodiment, the actuator can have at least two SMA elements, which are arranged in such a way that their respective directed force effects are at least partly directed against one another. These can be at least two SMA elements arranged about the axis in helical fashion and/or, for example, SMA elements arranged with a linear extent.

By way of example, the SMA elements can be connected, either indirectly or directly, to the element to be moved at opposing points.

The opposing SMA elements are preferably operated in the opposite sense. For example, if a contraction is brought about in one of the SMA elements, an extension is caused in the opposing SMA element as a compensation.

In further embodiments of the actuator, helically arranged SMA elements and elements arranged with a linear extent are combined, as a result of which a greater design freedom of the actuator and additional degrees of freedom of the movement of the element to be moved are achievable.

As already mentioned above, the SMA element can be indirectly connected to the element to be moved. By way of example, the further structure can be formed or attached to the element to be moved. The SMA element can also be effectively linked to the element to be moved by way of a transmission. An indirect connection simplifies the replacement of individual components and reduces wear.

In a further embodiment of the actuator, the SMA element is directly connected to the element to be moved and is screwed, clamped, welded or adhesively bonded to the latter, for example.

Advantages of a direct connection include a simplified design and requiring little space.

In a further embodiment option of the actuator, the element to be moved is connected to at least one fixed bearing. Here, the element to be moved is pivotable and/or rotatable about the fixed bearing as a result of the action of the at least one SMA element, advantageously of at least two SMA elements. In the case of an appropriate arrangement of the SMA elements, the element to be moved is pivotable and/or rotatable about the fixed hearing in a plane or in a space.

An actuator according to any one of the aforementioned embodiment options may be present in an arrangement comprising a flexure hearing. By way of example, the element to be moved is a portion of the flexure bearing.

The actuator can be arranged in an objective in order to move optical elements, e.g., optical lenses, there, By way of example, an objective can be a cinema lens, a camera lens, a telescopic sight, binocular field glasses and/or monocular field glasses.

An objective with the actuator solves a technical problem that previously placed very high demands on its implementation.

According to the prior art, movements in the interior of optical components, e.g., in objectives or other optical assemblies, were previously brought about by drives which were displaced from the optical component to the outside and operated by means of electric motors, for example.

An embodiment with an integrated actuator advantageously avoids, for example, an embodiment of the optical components that requires much space. Moreover, the actuation forces producible by means of an actuator according to the invention are greater than those that are achievable by means of miniaturized piezo-drives, for example.

The subject matter of the invention furthermore relates to an apparatus for moving an element to be moved into position, for example for adjusting an element to be moved, by means of the actuator. Here, the element to be moved can comprise a pinhole, wherein the pinhole is an aperture such as a hole or a slot, for example, in particular, the pinhole can be a pinhole of an optical arrangement, for example of a confocal microscope.

In further embodiments, the element to be moved can be a sensor and/or a correction mirror. The element to be moved could also be one or more lenses, stops and/or a prism system, in particular an deflecting system. It is also possible for at least two elements to be moved to be present, which, for example, are each embodied as an Alvarez plate and which should be moved relative to one another.

The movement of Alvarez plates, in particular, requires a very precise movement in a tightly restricted installation space.

In addition to movement in an XY-plane, rotational adjustments and rotational actuating movements are also possible by way of appropriately designed and arranged bearings and SMA elements, for example guided in a manner surrounding the element to be moved, in the form of wires.

The apparatus for moving the element to be moved into position comprises an evaluation unit for evaluating current spatial coordinates, including coordinates in space and relative spatial orientations, of the elements to be moved and/or of the SMA elements. Moreover, a control unit for generating control commands depending on the evaluated current spatial coordinates is present. By way of example, the spatial coordinates can be two-dimensional coordinates and/or coordinates in space and/or relative spatial orientations, for example of the element to be moved and of a profile of a current beam path of an optical arrangement, for example of a microscope, a measuring appliance, an appliance for use in a surgical or therapeutic method, an illumination apparatus or an exposure apparatus.

Such an apparatus can also be used for moving a sensor comprising a number of sensor elements. Here, the sensor can be moved by fractions of the extent of a sensor element (fractions of a pixel spacing; sub-pixel range). At least two images are recorded and combined by calculation by the appropriately moved sensor. This concept is also known as "sensor shift" and serves, for example, to improve color recognition and/or to increase the image resolution. In such a case, the sensor is, for example, a camera sensor, e.g., a CCD or CMOS chip. The sensor elements (pixels) thus moved in the direction of an X-axis and in the direction of a Y-axis, for example, supply data about the interstices of the sensor elements, which can be superposed, calculated and output by means of software.

The apparatus and/or the actuator can further be used to push a grating laterally into a beam path of an optical component, for example an objective, or an optical arrangement and/or to adjust said grating in the beam path. The resolution of a microscope can be increased by means of such a grating by way of a structured illumination of an object.

The actuator and the apparatus can be used in optical arrangements such as microscopy systems of any type, for example in laser scanning microscopes, electron microscopes and wide-field microscopes.

An optical arrangement can have a plurality of actuators according to the invention in the same embodiment or in different embodiments.

By means of the apparatus for moving the element to be moved into position, a possibility of the actuator for correction adjustments (adjustment) of the element or elements to be moved is specified, for example. The required positioning movements can be implemented radially, axially and also rotationally.

Advantageously, a displacement of the actuator to outside of the optical component has been avoided. In the case of inaccessibility of the optical component, for example as a result of an incubation structure, the adjustment according to the prior art must be driven by motor from the outside, while the apparatus for moving the element to be moved into position according to the invention provides a drive in the interior of the optical component.

These optical components advantageously provided with a drive in the interior thereof are less sensitive to environmental influences such as humidity or corrosive media. Moreover, they are easier to clean and require less installation space than optical components with drives situated on the outside.

The actuator can be used to move components of an objective into position. It can also be used to adjust an element to be moved comprising a pinhole, a stop or a correction mirror. A further possible use of the actuator lies in the adjustment of at least two Alvarez plates relative to one another.

The actuator and/or the adjustment apparatus can be used for adjusting a sensor.

In a method for moving the sensor into position, wherein the sensor comprises a number of sensor elements, the sensor is moved in controlled fashion by means of the actuator. When carrying out the method, actual measured values of the sensor present in the optical arrangement are captured and evaluated by virtue of the actual measured values being compared to the intended measured values. Control commands are generated depending on the result of the comparison.

By way of example, the measured values are capturable by means of a resistance measurement of the SMA elements.

In further embodiments of the actuator, control loops may be present for optimizing position, correction values or other optical parameters within the optical arrangement, for example within the microscope.

A generation of control commands can be emitted if the deviation of actual measured values from intended measured values remains within an admissible tolerance limit.

The extent of a sensor element can be understood to be a picture element or pixel. It is particularly advantageous if a movement of the sensor into position is implemented over distances that are fractions of one of the dimensions of the sensor elements. This means that the sensor can be displaced and/or rotated by half a pixel, for example.

Such movement into position or adjustment of the sensor can be used to increase the resolution, for example, of imaging by means of the sensor. In such a case, the sensor is, for example, a camera sensor, e.g., a CCD or CMOS chip.

Moreover, the object is achieved by method for adjusting an element to be moved, which, when carried out, causes the element to be moved to be moved into position at an intended position by means of the actuator. In a further step, the element to be moved is affixed at the intended position by means of a non-solidified and reversibly solidifiable fastening material, wherein the non-solidified fastening material is converted into the solidified state.

By way of example, a hot melt adhesive can be used as fastening material. The latter is highly viscous or solid in its solidified state and only hardly viscous or liquid in its non-solidified state. The fastening material is reversibly solidifiable if the latter can be brought from its solidified state into its non-solidified state, and back, multiple times. By way of example, the thermal energy can be supplied to, or dissipated from, the fastening material for the purposes of changing the states.

An element to be moved that is situated at an actual position and already fastened by means of the reversibly solidified fastening material is moved into position at the intended position after the fastening material was converted into the non-solidified state.

There can be permanent fastening of the element to be moved in further configurations of the method. By way of example, an adhesive that is curable by means of UV radiation (UV adhesive) is usable as fastening material.

The proposed method facilitates an adjustment of, for example, lenses or lens groups of an optical component, e.g., of an objective, without drives arranged outside of the optical component being required.

The proposed solutions, in particular the actuator, the uses thereof and the adjustment methods advantageously allow one or more elements to be moved to be adjusted over small distances with high accuracy and very good reproducibility. The described solutions facilitate the use of actuators under structurally difficult conditions, in the case of little available installation space and with little expenditure.

Figure 2:
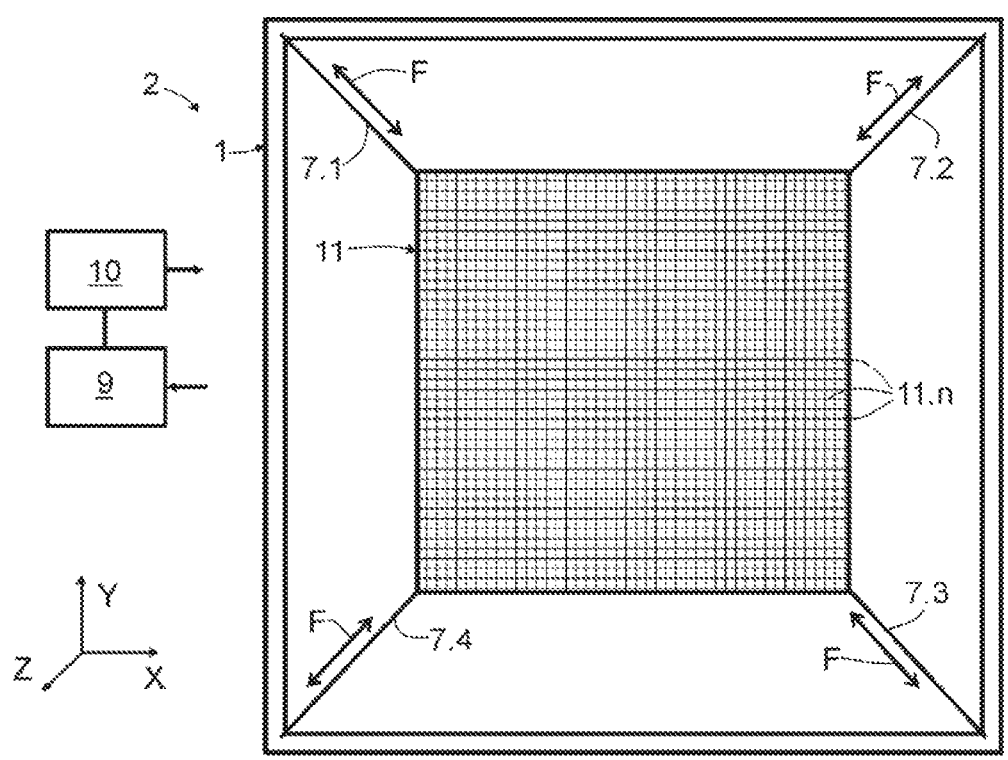
FIG. 2 shows a schematic illustration of a second exemplary embodiment of an actuator according to the invention.
Figure 3:
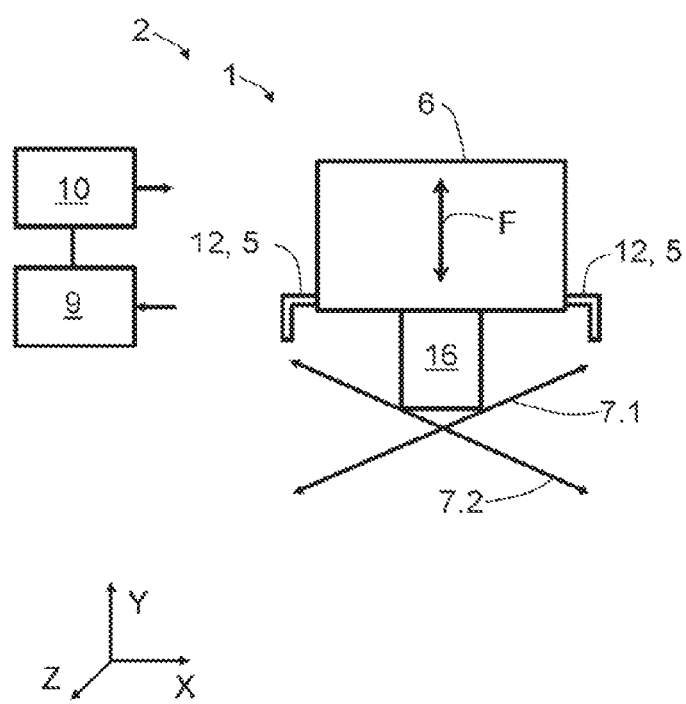
FIG. 3 shows a schematic illustration of a third exemplary embodiment of an actuator according to the invention.
Figure 4:
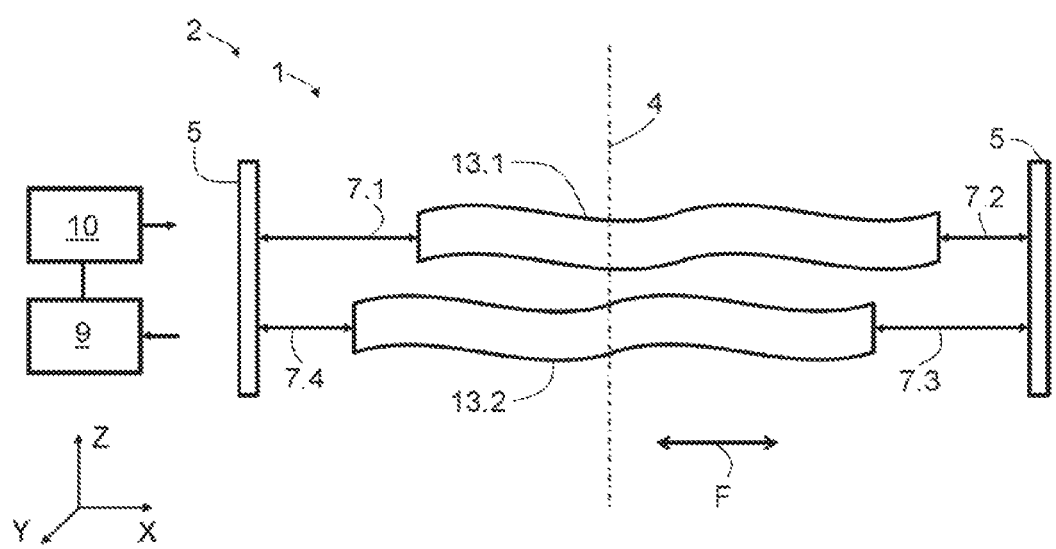
FIG. 4 shows a schematic illustration of a fourth exemplary embodiment of an actuator according to the invention.
Figure 5:
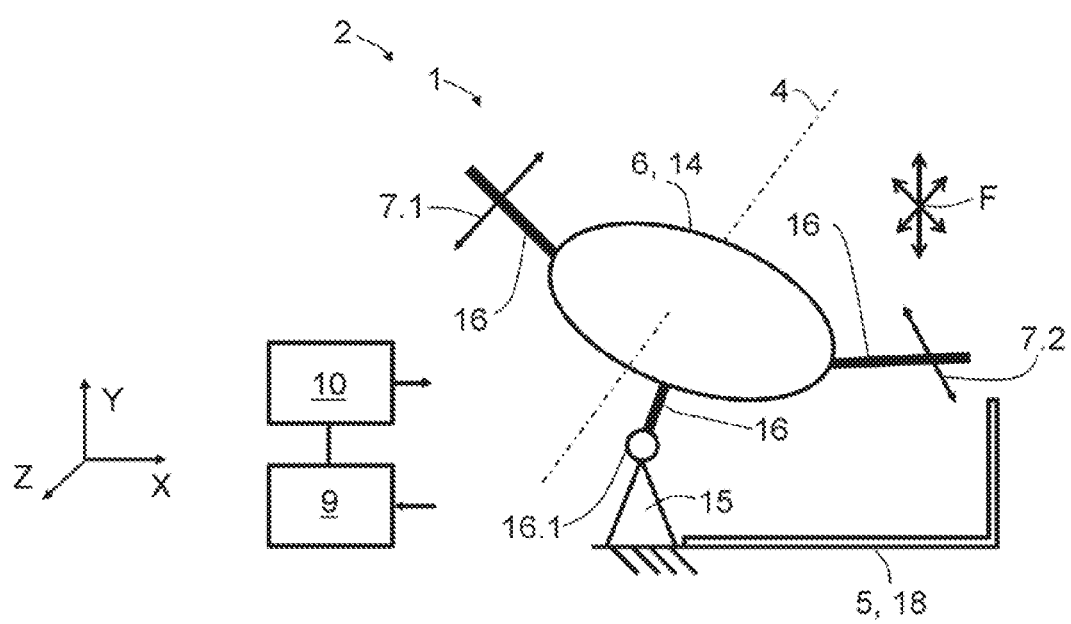
FIG. 5 shows a schematic illustration of a fifth exemplary embodiment of an actuator according to the invention and of an apparatus according to the invention.
Figure 6:
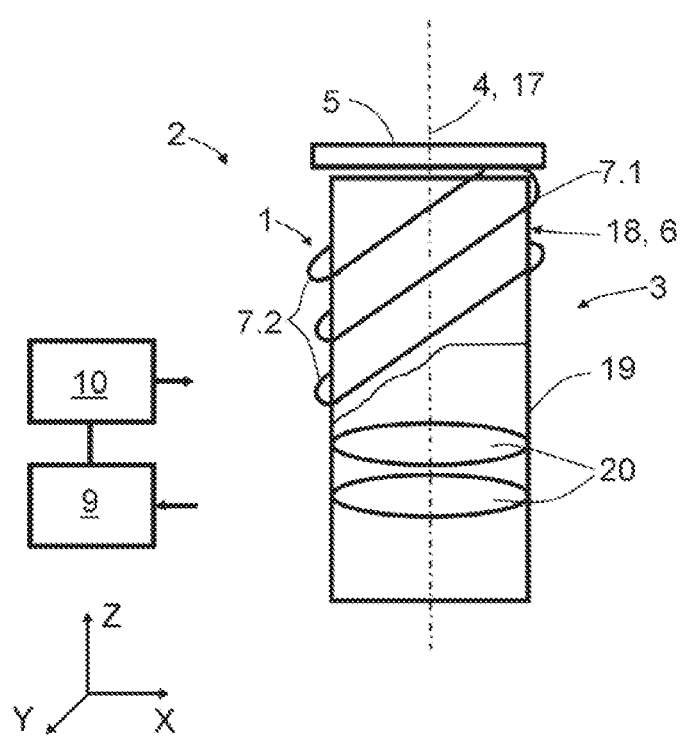
FIG. 6 shows a schematic illustration of a sixth exemplary embodiment of an actuator according to the invention and of an apparatus according to the invention.
Figure 7:
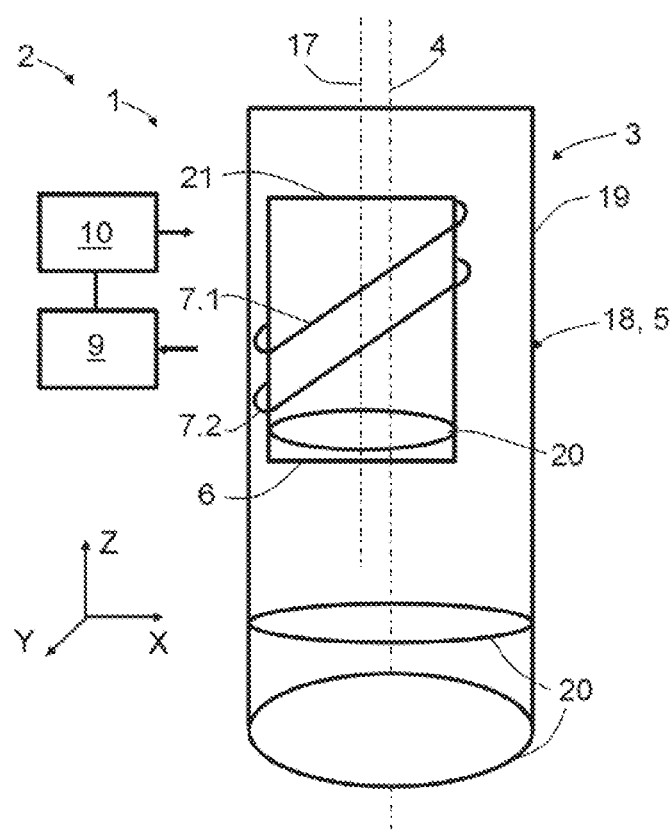
FIG. 7 shows a schematic illustration of a seventh exemplary embodiment of an actuator according to the invention and of an apparatus according to the invention.
Figure 8:
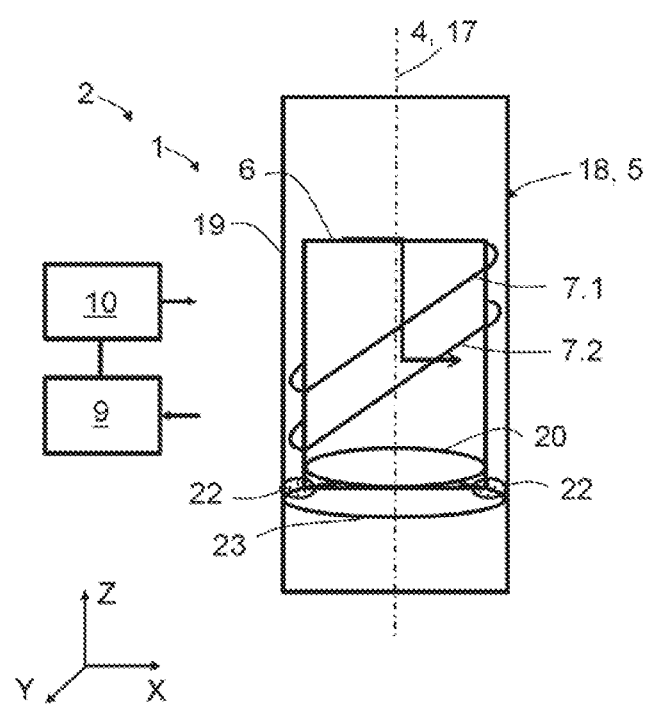
FIG. 8 shows a schematic illustration of an eighth exemplary embodiment of an actuator according to the invention and of an apparatus according to the invention.

The invention is explained in more detail below on the basis of exemplary embodiments and figures. In the figures:

FIG. 1 shows a schematic illustration of a first exemplary embodiment of an actuator according to the invention, FIG. 2 shows a schematic illustration of a second exemplary embodiment of an actuator according to the invention, FIG. 3 shows a schematic illustration of a third exemplary embodiment of an actuator according to the invention, FIG. 4 shows a schematic illustration of a fourth exemplary embodiment of an actuator according to the invention, FIG. 5 shows a schematic illustration of a fifth exemplary embodiment of an actuator according to the invention and of an apparatus according to the invention, FIG. 6 shows a schematic illustration of a sixth exemplary embodiment of an actuator according to the invention and of an apparatus according to the invention, FIG. 7 shows a schematic illustration of a seventh exemplary embodiment of an actuator according to the invention and of an apparatus according to the invention, and FIG. 8 shows a schematic illustration of an eighth exemplary embodiment of an actuator according to the invention and of an apparatus according to the invention.

The same technical elements are labeled by the same reference sign in the schematic illustrations of the exemplary embodiments if nothing else is expressly specified. The illustrations are not true to scale.

As essential components, an actuator 1 comprises an element 6 to be moved, a carrier 5 and at least one SMA element 7.1 to 7.4, wherein the SMA element 7.1 to 7.4 is connected to the element 6 to be moved and embodied so as to be supported on the carrier 5 (FIG. 1).

In a first exemplary embodiment of an actuator 1 according to the invention, which is a constituent part of an optical arrangement 2 not illustrated here, a first SMA element 7.1, a second SMA element 7.2, a third SMA element 7.3 and a fourth SMA element 7.4 are present. The element 6 to be moved is embodied as a plate with an opening in the center thereof, which serves as a pinhole 8 of the optical arrangement 2, in particular of a microscope. The element 6 to be moved extends in an XY plane XY that is spanned by the X-axis X and a Y-axis Y of a Cartesian coordinate system.

In a further embodiment of the actuator 1, the element 6 to be moved is embodied as a holder for an optical element such as a lens or lens group, or it serves as a holder for a pane or plate in which the opening is situated, said opening being embodied as a hole, slot, crossed slot, circular ring or differently.

The element 6 to be moved is surrounded by the carrier 5 embodied as a frame and directly connected to the carrier 5 by means of the SMA elements 7.1 to 7.4. Each of the SMA elements 7.1 to 7.4 is connected to one of the corners of the element 6 to be moved, and so the longitudinal axes of the SMA elements 7.1 to 7.4 intersect virtually in the XY-plane XY.

The SMA elements 7.1 to 7.4 are embodied as wires; however, they may also be embodied as rods or bands in further embodiments. An actuator 1 can have SMA elements of different forms.

A directed force effect F is exerted on the element 6 to be moved (symbolized by means of double-headed arrows) as a result of a change in the extent of the SMA elements 7.1 to 7.4 in at least one of their dimensions, in particular in the direction of their longitudinal axes, the directed force effect making the element 6 to be moved displaceable in the XY-plane XV and the pinhole 8 adjustable in relation to an optical axis 4, extending in the direction of the Z-axis Z, of the optical arrangement 2.

Respectively two the SMA elements 7.1 to 7.4 are arranged in such a way that their respective directed force effects F are directed against one another, at least in portions.

By means of a control unit 10, the SMA elements 7.1 to 7.4 are actuatable independently of one another. Here, the actuation is implemented by virtue of, for example, an electric current with a certain amplitude and with a certain voltage flowing through each of the SMA elements 7.1 to 7.4. A change in at least one dimension of the SMA elements 7.1 to 7.4 is brought about as a consequence of the ohmic resistance of the respective SMA elements 7.1 to 7.4 and the heat produced in the process.

A current length and a current ohmic resistance of each of the SMA elements 7.1 to 7.4 is capturable by means of a suitable measuring circuit (not shown) known to a person skilled in the art. The measured values obtained in the process are transmitted to an evaluation unit 9, which, in turn, is connected to the control unit 10 in a manner suitable for the transmission of data. The evaluation unit 9 is configured to evaluate current spatial coordinates, for example of the SMA elements 7.1 to 7.4, and the current stretch states thereof, the current spatial position of a beam path of the optical arrangement 2 and/or the current relative orientation of the element 6 to be moved, in particular of the pinhole 8, in relation to the current beam path.

The actuator 1, the evaluation unit 9 and the control unit 10 are essential elements of an apparatus for adjusting the element 6 to be moved.

The control unit 10 generates and outputs control signals for actuating the SMA elements 7.1 to 7.4 depending on the measured values transmitted by the evaluation unit 9 and/or on evaluation results of the evaluation unit 9 and optionally by making use of further measured values such as the ambient temperature, for example. The optical axis 4 of the optical arrangement 2 is specified by the current beam path or the current profile thereof.

The control commands are implemented in apparatuses not illustrated here and the corresponding current flows and/or temperature changes of the SMA elements 7.1 to 7.4 are brought about.

The element 6 to be moved can be adjusted in relation to the optical axis 4. Additionally or alternatively, it is also possible to bring the current profile of the optical axis 4 into correspondence with the current position of the pinhole 8, for example.

The actuation options and the options for designing the apparatus specified above apply equally to the following exemplary embodiments.

After adjusting the element 6 to be moved, the stability of the relative orientation thereof, for example in respect of the XY-plane XY, and of the position thereof is of particular importance. Therefore, after the cooling thereof, the SMA elements 7.1 to 7.4 are in a mechanical force equilibrium. An additional brake can be provided in particularly critical applications. Such a brake can be realized by virtue of the element 6 to be moved being pressed against a stationary abutment by way of a spring, for example, and thus being fastened. An SMA element can be used in turn to release the spring. Magnetic couplings are also advantageously employable.

The actuator 1 and the optical arrangement 1 according to FIG. 2 correspond to those in FIG. 1 with the exception that the element 6 to be moved is a sensor 11, which has a number of sensor elements 11.$n$ on its detection surface. The dimension of each of the sensor elements 11.$n$ in the direction of the X-axis X and in the direction of the Y-axis Y corresponds to a pixel spacing.

A means for increasing the resolution of digital image recordings consists of moving the sensor 11 into position by fractions of a pixel space. Compared to the prior art, the use of SMA elements 7.1, 7.2 offers an option that saves space and costs and is very precise and reproducible.

When carrying out a method for adjusting the sensor 11, actual measured values of the sensor 11 present in the optical arrangement 2 are captured and evaluated by virtue of the actual measured values being compared to the intended measured values by means of the evaluation unit 9. Depending on the results of the comparison which are transmitted to the control unit 10, the latter generates the control commands. Generating the control commands can be dispensed with in the case of a deviation of the actual measured values from the intended measured values that lies within an admissible tolerance limit. The moving into position or adjustment of the sensor 11 is implemented by distances that are fractions of one of the dimensions, i.e., of the pixel spacings, of the sensor elements 11.$n$. Here, an adjustment can also be implemented by a displacement by several pixel distances and/or by fractions of a pixel distance.

In the embodiment of a method for moving the sensor 11 into position, it is possible to dispense with feedback for the measurement signal provided the construction ensures that the actuating movement is not greater than the extent of the sensor element 11.$n$. The precise actuating movement can be monitored, for example in order also to ensure a linear actuating movement. A cycle of the actuating movement must be synchronized with the recording times of the sensor 11. The actuating movement of the sensor 11 is implemented by distances that are fractions of one of the dimensions, i.e., of the pixel spacings, of the sensor elements 11.$n$ (sensor shift).

One or more of the SMA elements 7.1 to 7.4 can be replaced by a spring element in further possible embodiments of the actuator 1. On account of the dynamic applications of the actuator 1, the SMA elements present can work against the spring element or the spring elements. By way of example, two of the SMA elements 7.1 to 7.4, for example the first and the fourth SMA element 7.1, 7.4, can be replaced by appropriately adapted spring elements.

FIG. 3 illustrates an actuator 1, the carrier 5 of which is formed by a flexure bearing 12 (only shown in much simplified fashion), on which the element 6 to be moved is formed or attached. A first and a second SMA element 7.1, 7.2 are embodied crossing one another and being in contact with a connecting element 16 over a region of their longitudinal extents. The SMA elements 7.1, 7.2 contact the connecting element 16 and exert a force effect F on the connecting element 16 in the case of a change in their respective longitudinal extent, said connecting element in turn being formed on, or attached to, the element 6 to be moved. The SMA elements 7.1, 7.2 are indirectly connected to the element 6 to be moved by way of the connecting element 16.

The flexure bearing 12, as a spring element, acts in antagonistic fashion to the force effect F caused by the SMA elements 7.1, 7.2.

In a fourth exemplary embodiment of the actuator 1, illustrated in FIG. 4, two elements 6 to be moved are present, said elements to be moved being configured as a first Alvarez plate 13.1 and as a second Alvarez plate 13.2, also referred to as Alvarez lenses. The first and the second SMA element 7.1, 7.2 are connected to the end faces of the first Alvarez plate 13.1 and the third and fourth SMA element 7.3, 7.4 are connected to the end faces of the second Alvarez plate 13.2. The two Alvarez plates 13.1, 13.2 are displaceable relative to one another and relative to the optical axis 4 in the XY-plane XY by means of the SMA elements 7.1 to 7.4.

In a further exemplary embodiment, respectively one of the SMA elements with an antagonistic effect is embodied as a spring element.

FIG. 5 shows a fifth example embodiment of the actuator 1, the element 6 to be moved of which is formed by a correction mirror 14.

Via two connecting elements 16 and a joint 16.1, the correction mirror 14 is indirectly connected to an SMA element 7.1, 7.2 in each case.

A third connecting element 16 connects a fixed bearing 15 to the correction mirror 14 via a joint 16.1.

If the SMA elements 7.1, 7.2 are spanned in the XY-plane XV in one possible embodiment, a tilting movement of the correction mirror 14 is producible about the joint 16 of the fixed bearing 15 in the XY-plane XY. Slight rotational movements within the XY-plane XV are also possible.

The correction mirror 14 can be tilted (rotated) relative to the XY-plane XV and to the optical axis 4 if at least one of the SMA elements 7.1, 7.2 is spanned extending in the XZ-plane XZ and/or in the YZ-plane YZ.

If both SMA elements 7.1, 7.2 have X, Y and Z-coordinates that change over their lengths, movements in all planes and tilts (rotations) about all axes X, Y and Z, and combinations of these movements, are realizable.

If optical elements such as lenses, mirrors and/or stops are varied in the beam path of an optical arrangement 2, the alignment thereof changes minimally but often causes disturbances. This applies, in particular, in the case where the beam path must strike a pinhole 8, as is the case in a laser scanning microscope (LSM) (see also FIG. 1). The correction mirror 14 with a suitable diameter can be introduced into the beam path for the purposes of correcting the beam. According to the invention, the latter is movable in selected directions or in all directions by means of the SMA elements 7.1, 7.2.

The SMA elements, in this case the first and the second SMA element 7.1, 7.2, can be arranged extending helically about an axis 17 of an optical component 3 of the optical arrangement 2 in further exemplary embodiments.

In an embodiment of the optical component 3 comprising the actuator 1, the SMA elements 7.1, 7.2 are arranged on the external surface of a housing 18 of an objective 19, extending parallel to one another about a longitudinal axis (axis 17) (FIG. 6). Only a few turns of the SMA elements 7.1, 7.2 are shown in exemplary fashion. The axis 17 coincides with the optical axis 4 in the illustrated exemplary embodiment. The SMA elements 7.1, 7.2 are connected to the housing 18 and supported on the carrier 5. In this case, the housing 18 represents the element 6 to be moved.

As a consequence of changes in lengths in the SMA elements 7.1, 7.2, the optical component 3 is displaced in controlled fashion along the optical axis 4.

The embodiment option schematically shown in FIG. 6 is also usable for correcting elements, for example optical lenses 20 within an objective 19.

Such an exemplary embodiment is illustrated schematically in FIG. 7. A mount 21 of an optical lens 20 is surrounded by two SMA elements 7.1, 7.2 in helical fashion in the housing 18 of the objective 19, The optical lens 20 held in the mount 21 represents the element 6 to be moved. The SMA elements 7.1, 7.2 are connected to the mount 21 and supported on the housing 18, the latter acting as a carrier 5 for the actuator 1.

The mount 21 is arranged with an offset in relation to the optical axis 4, and so the axis 17 and the optical axis 4 of the optical component 3 do not coincide.

A method for adjusting the element 6 to be moved is explained on the basis of FIG. 8. In the exemplary embodiment, the element 6 to be moved is an optical lens 20, which is adjusted along the optical axis 4 in an objective 19. The SMA elements 7.1, 7.2 are supported on the housing 18, the latter acting as a carrier 5 for the actuator 1.

The element 6 to be moved is brought into an intended position by virtue of the latter being displaced by means of an actuator 1. Once the element 6 to be moved is at the intended position, the latter is fastened by means of a non-solidified and reversibly solidifiable fastening material 22. In the process, the non-solidified fastening material 22 is converted into the solidified state by virtue of being cooled to room temperature at approximately 20° C., for example.

During the adjustment, the fastening material 22 is kept in the non-solidified state by virtue of thermal energy being supplied to the fastening material 22 by means of an electrically operated heating wire 23.

In a further embodiment of the actuator 1, at least one of the SMA elements 7.1, 7.2 is embodied as a heating wire, which serves to supply thermal energy into the fastening material 22.

Should the element 6 to be moved be adjusted again, the fastening material 22 is heated again by means of the heating wire 23 and displaced into a new intended position, as described above, by means of the actuator 1. Once the element 6 to be moved has been moved into position at the new intended position, the heating power of the heating wire 23 is reduced or deactivated. The fastening material 22 subsequently transitioning into the solidified state again holds the element 6 to be moved at the new intended position.

REFERENCE SIGNS

1 Actuator
2 Optical arrangement
3 Optical component
4 Optical axis
5 Carrier
6 Element to be moved
7.1 First SMA element
7.2 Second SMA element
7.3 Third SMA element
7.4 Fourth SMA element
8 Pinhole
9 Evaluation unit
10 Control unit
11 Sensor
11.$n$ Sensor element 12 Flexure bearing
13.1 First Alvarez plate
13.2 Second Alvarez plate
14 Correction mirror
15 Fixed bearing
16 Connecting element
16.1 Joint
17 Axis
18 Housing
19 Objective
20 Optical lens
21 Mount
22 Fastening material
3 Heating wire
F Force effect
X X-axis
Y Y-axis
Z Z-axis
XY XY-plane
XZ XZ-plane
YZ YZ-plane

The invention claimed is:

1. An actuator for producing actuating movement of an element to be moved in a beam path of an optical arrangement comprising a sensor element, said actuator comprising:
the element to be moved,
a carrier,
a first shape memory alloy (SMA) element, and
a second SMA element, wherein the first SMA element and the second SMA element are connected to the element to be moved and embodied so as to be supported on the carrier, such that directed force effects are produced between the element to be moved and the carrier to move the element to be moved by a distance corresponding to a fraction of the sensor element and in a direction crossing or aligned with an optical axis of the optical arrangement based on changes in extents of the first SMA element and the second SMA element in different directions.

2. An actuator for producing actuating movement of an element to be moved in a beam path of an optical arrangement, said actuator comprising:
the element to be moved,
a carrier, and
at least one SMA element,
wherein the SMA element is connected to the element to be moved and embodied so as to be supported on the carrier, such that a directed force effect is produced between the element to be moved and the carrier in case of a change in extent of the SMA element, and
wherein the SMA element is arranged about the element to be moved in a helical fashion such that, when a change occurs in an extent of the SMA element in a length direction, a directed force effect is caused in a direction of an axis and/or a rotation of the actuator about the axis.

3. The actuator as claimed in claim 1, wherein the first and second SMA elements are arranged in such a way that the respective directed force effects thereof are, at least in components, directed in opposing directions against one another.

4. The actuator as claimed in claim 1, wherein at least one of the first or second SMA elements is indirectly connected to the element to be moved.

5. The actuator as claimed in claim 1, wherein at least one of the first or second SMA elements is directly connected to the element to be moved.

6. The actuator as claimed in claim 1, wherein the element to be moved is connected to at least one fixed bearing.

7. A flexure bearing, comprising:
an actuator as claimed in claim 1.

8. An objective, comprising:
an actuator as claimed in claim 2.

9. An apparatus for producing an actuating movement of an element to be moved comprising a pinhole, a sensor, one or more Alvarez plates, or a correction mirror, the apparatus comprising:
an actuator as claimed in claim 1,
an evaluation unit configured to evaluate current spatial coordinates, and
a control unit configured to generate control commands depending on the evaluated current spatial coordinates.

10. A method for moving a component of an objective into position, said method comprising: moving said component of said objective into position with an actuator as claimed in claim 2.

11. A method for producing an actuating movement of an element to be moved comprising a pinhole, a correction mirror, a sensor or one or more Alvarez plates, said method comprising:
producing said actuating movement with an actuator as claimed in claim 1.

12. A method for producing an actuating movement of a sensor comprising a number of sensor elements by a fraction of an extent of a sensor element, said method comprising:
producing said actuating movement with an actuator as claimed in claim 1.

13. A method for producing an actuating movement of a sensor comprising a number of sensor elements, said method comprising:
producing said actuating movement with an actuator comprising an element to be moved, a carrier, and at least one SMA element, wherein the SMA element is connected to the element to be moved and embodied so as to be supported on the carrier, such that a directed force effect is produced between the element to be moved and the carrier in case of a change in extent of the SMA element,
wherein actual measured values of the sensor present in the optical arrangement are captured and evaluated by virtue of the actual measured values being compared to intended measured values and, depending on the result of the comparison, control commands being generated, wherein an actuating movement of the sensor is implemented by distances that are fractions of one of the dimensions of the sensor elements.

14. A method for producing an actuating movement of an element to be moved, comprising:
moving the element to be moved into position at an intended position with an actuator as claimed in claim 1, and
affixing the element to be moved at the intended position with a non-solidified and reversibly solidifiable fastening material, wherein the non-solidified fastening material is converted into the solidified state.

15. The method as claimed in claim 14, wherein an element to be moved that is situated at an actual position and fastened with the reversibly solidified fastening material is moved into position at the intended position after the fastening material was converted into the non-solidified state.

* * * * *